United States Patent [19]
Gebhard et al.

[11] Patent Number: 5,746,509
[45] Date of Patent: May 5, 1998

[54] HYDROSTATIC-MECHANICAL GEAR FOR DRIVING A MIXING DRUM

[75] Inventors: Wolfgang Gebhard; Egon Mann, both of Friedrichshafen, Germany

[73] Assignee: ZF Friedrichshafen AG, Friedrichshafen, Germany

[21] Appl. No.: 537,805

[22] PCT Filed: Apr. 19, 1994

[86] PCT No.: PCT/EP94/01203

§ 371 Date: Oct. 18, 1995

§ 102(e) Date: Oct. 18, 1995

[87] PCT Pub. No.: WO94/23918

PCT Pub. Date: Oct. 27, 1994

[30] Foreign Application Priority Data

Apr. 21, 1993 [DE] Germany .............. 43 13 025.9

[51] Int. Cl.[6] .................. F16D 31/02; B28C 5/42
[52] U.S. Cl. .................. 366/61; 60/456; 60/464; 92/72; 92/130 R
[58] Field of Search .................. 366/60–63, 53, 366/54, 56–59, 232, 233; 60/406, 455, 456, 464, 488; 92/72, 130 R, 130 B, 135

[56] References Cited

U.S. PATENT DOCUMENTS

| | | |
|---|---|---|
| 3,080,152 | 3/1963 | Lendved . |
| 3,333,415 | 8/1967 | Adams ............................ 60/464 X |
| 3,359,727 | 12/1967 | Hann et al. ...................... 60/456 X |
| 3,969,897 | 7/1976 | Humphreys et al. ................. 60/456 |
| 4,329,064 | 5/1982 | Mann et al. . |
| 4,542,990 | 9/1985 | Fouquet . |

FOREIGN PATENT DOCUMENTS

| | | | |
|---|---|---|---|
| 227590 | 5/1963 | Austria ......................... 366/61 |
| 1 296 728 | 5/1962 | France . |
| 1 317 507 | 1/1963 | France . |

*Primary Examiner*—Charles E. Cooley
*Attorney, Agent, or Firm*—Davis and Bujold

[57] ABSTRACT

The invention concerns a hydrostatic-mechanical gear for driving a mixed drum and, in particular, the drum of a concrete mixer vehicle. Cooling is provided for by the continuous removal of oil from a high pressure circuit, via a connecting pipe, and the constant feeding of the cooled oil, which has passed through an oil cooler, to the interior of a gear housing via a pipe. This pipe discharges into the interior of the gear housing immediately proximate a hydraulic motor. The oil then flows through the hydraulic motor, which is preferably a slow-speed radial piston motor, to reduce the noise generation of the hydraulic motor.

14 Claims, 3 Drawing Sheets

HYDROSTATIC-MECHANICAL GEAR FOR DRIVING A MIXING DRUM

The invention relates generally to a hydrostatic-mechanical gear for driving a mixing drum. In particular, it refers to the driving of the mixing drum of a concrete mixer truck. The gear has a hydraulic pump connected by pipes with a hydraulic motor. The hydraulic pump is surrounded by a pump housing. A gear housing serves to accommodate the hydraulic motor and a planetary gear. The web of said planetary gear is in driving connection with an input flange of the mixing drum.

BACKGROUND OF THE INVENTION

DE-A-29 04 107 has disclosed a mixing drum drive for a mixer truck in which the hydraulic motor is situated, in within a gear housing. An oil tank surrounds the hydraulic motor in order to obtain a compact design and better facilitate the removal of heat.

SUMMARY OF THE INVENTION

This invention improves a gear for driving a mixing drum in the sense of better cooling the hydrostatic part of the motor. The gear, of the present invention, also especially stands out because of compact design and noise reduction. In addition rotation of the mixing drum after the motor has been switched off is prevented.

The problem on which the invention is based is solved by the fact that oil is constantly removed from the high-pressure circuit via a connecting pipe, and that in addition oil that has passed an oil cooler is constantly fed to the interior of the gear housing via a pipe, said pipe discharging at a place in the gear housing which immediately adjoins the hydraulic motor. In the proposed solution, the cooling consists of two separate systems. Part of the oil in the closed high-pressure circuit is constantly replaced by cooled oil. In addition, the cooled oil is passed into the interior of the gear housing, specifically in the immediate proximity of the hydraulic motor. This oil flows through the hydraulic motor which is preferably designed as a slow-speed radial piston motor. The pistons, the rollers, the cam and the cylinder block are hereby cooled. This prolongs the service life of said structural parts, especially the cam. The oil removed either reaches the interior of the pump housing for flushing the pump or is supplied, immediately bypassing the pump, to the pipe leading to the oil cooler.

The connecting pipes lead to a flushing slide valve which connects a pipe under high pressure, at the time, with a low-pressure side by a flushing valve. The flushing slide valve and the flushing valve are preferably situated in the gear housing.

An especially good cooling of the supply pump is obtained when oil is absorbed by the supply pump from the interior of the gear housing via a pipe and a filter.

A constructionally simple solution consists in making the flushing slide valve from a 3/3 directional valve and the flushing valve from a pressure-limiting valve.

An especially effective cooling of the hydraulic motor is obtained in a simple manner when the pipe discharges in the interior of the gear housing in immediate proximity of the hydraulic motor. In this case, the oil that flows out from the pipe flows in an axial direction by the cam, the rollers, the pistons and the cylinder block of the radial piston motor.

When the pipe discharges in immediate proximity of the hydraulic motor, the added advantage that the oil flowing out from the pipe and the leakage oil of the hydraulic motor become mixed can be obtained.

An essential feature consists in that each piston of the hydraulic motor is supported by spring elements of the cylinder block. The spring element ensures that the piston and the associated roller are constantly biased against the cam path. When reversing the direction of rotation, such as during the reswitching of the drum, the hydraulic motor acts as a pump and each piston is consecutively pressed inward away from the cam path. During operation, the hydraulic oil, which is located between the cylinder surface of each piston and the cylinder block, is placed under pressure so that any leakage oil overflows into the interior of the gear housing.

When the piston reaches its inner most point during reversal, i.e. it is forced toward the center, the spring element ensures that each piston is again biased radially outward toward the direction of the cam path. During further rotation, oil is resucked so that when the piston again moves inward, the leakage oil is again displaced. By this operation, the mixing drum is braked to the extent that subsequent rotation is prevented. When the hydraulic motor is operated as a motor, the spring elements are essentially inactive. Thus, a constant force-locking connection between the rollers, the pistons and the cam of the radial piston motor can be obtained, which serves to prevent rotation of the concrete mixing drum after the internal combustion engine has been switched off. Said rotation is avoided, since an interruption of the power flow from the concrete mixing drum to the hydrostatic part of the motor is prevented.

In order that no tipping forces act upon the hydraulic motor, the drag connection between the hydraulic motor and the inner central wheel of the planetary gear is made from a spline. This exclusively transmits one torque. The spline preferably has a spherical shape in a longitudinal direction.

In order to prevent transmission of tipping torques, the inner central wheel is fastened by a collar in an axial direction, to the cylinder block of the hydraulic motor.

A simple arrangement is obtained if the gear housing is composed of two housing halves. In this case, only one sealing location exists so that the cost of a reliable sealing of the gear housing is small.

For the manufacture, assembly and maintenance of the gear it is especially advantageous that it be designed as a system unit. Said system unit consists of one filter, one tank, one oil cooler and one hydraulic motor.

To reduce the generation of noise, it is further advantageous to make the hydraulic motor a slow-speed radial piston motor.

Other essential features of the invention and the advantages resulting therefrom are to be understood from the description that follows.

DESCRIPTION OF THE PREFERRED EMBODIMENTS

Figure 1:
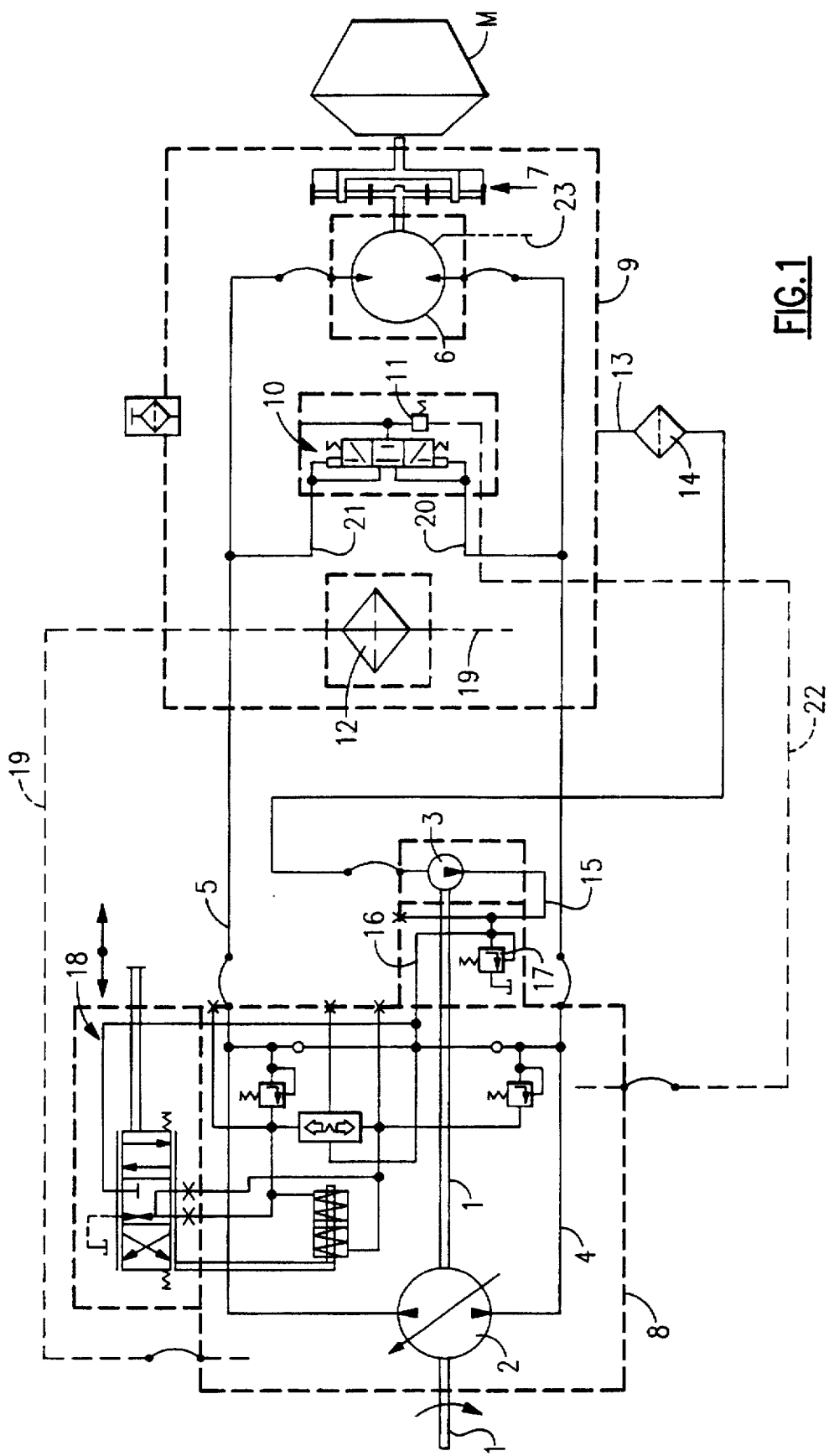
FIG. 1 is a hydraulic diagram of a hydrostatic-mechanical mixing gear.

In FIG. 1, a hydraulic pump 2 is driven by a shaft 1 attached to an internal combustion engine (itself not shown).

The hydraulic pump 2 is made as an adjusting unit with reversible directions of rotation. In addition, a supply pump 3 is driven by the extended shaft 1.

The hydraulic pump 2 is connected with a hydraulic motor 6 by (supply and return) pipes 4 and 5. The hydraulic motor 6 drives a concrete mixer drum by a rear-mounted, one-step planetary gear 7.

The hydraulic pump 2 is surrounded by a pump housing 8. A gear housing 9 surrounds the hydraulic motor 6, the planetary gear 7, a flushing slide valve 10 and a flushing valve 11.

An oil cooler 12 is additionally situated in the gear housing 9. The oil cooler 12 can also be preferably directly flanged on the gear housing 9.

A pipe 13 leads from the gear housing 9 to a filter 14 and from there to the supply pump 3. Via the pipe 13 and the filter 14 the supply pump 3 absorbs oil from the interior of the gear housing 9, conveying it via a pipe 15, from which a pipe 16 branches off, into a respective low-pressure circuit. A pressure-limiting valve 17 is attached to the pipe 16.

The opening pressure of the pressure-limiting valve 17 is above the opening pressure of the flushing valve 11. The pressure-limiting valve 17 can be adjusted to an opening pressure of 25 bar, for instance, while the flushing valve opens at a pressure of 20 bar.

The hydraulic adjusting unit 18 is of a construction known per se and serves to adjust the hydraulic pump 2.

The pump housing 8 is connected with the oil cooler 12 via a (deposit) pipe 19. The pipe 19 discharges behind the oil cooler 12 in the gear housing 9.

Connecting pipes 20 and 21 lead from the pipes 4 and 5 to the flushing slide valve 10. Depending on the direction of rotation of the hydraulic pump 2, a high pressure prevails either in the pipe 4 or in the pipe 5 so that either the field appearing below in the drawing or the field appearing above in the drawing of the flushing slide valve 10, designed as a 3/3 directional valve, is engaged. Therefore, part of the oil constantly flows back into the pump housing 8 from one of the pipes 4 or 5 via the flushing valve 11 and a connecting pipe 22. If the hydraulic pump 2 is not flushed, the pipe 22 discharges not in the pump housing, but is connected with the pipe 19, before the oil cooler 12.

During operation of the hydraulic motor 6, leakage oil which drains into the interior of the gear housing 9 accumulates. This should become clear by a diagrammatically plotted pipe 23 for the leakage of oil. For the sake of a better understanding, let it be mentioned at this time that the discharge point of the pipe 19, from which the cooled oil flows into the gear housing 9, is spatially disposed in such a manner that said oil flows around the hydraulic motor 6 and thereby the accumulated, heated, leakage oil is removed by mixing.

With the aid of the above explained hydraulic diagram it becomes clear that the hydrostatic-mechanical gear is cooled in two ways: part of the oil in the closed high-pressure circuit (hydraulic pump 2, pipes 4 and 5 and hydraulic motor 6) is removed via the flushing valve 11 and is constantly replaced by cold oil from the interior of the gear housing 9 via the supply pump 3.

The cold oil flowing out from the pipe 19 flows through the hydraulic motor 6 which is preferably designed as a slow-speed radial piston motor.

Figure 2:
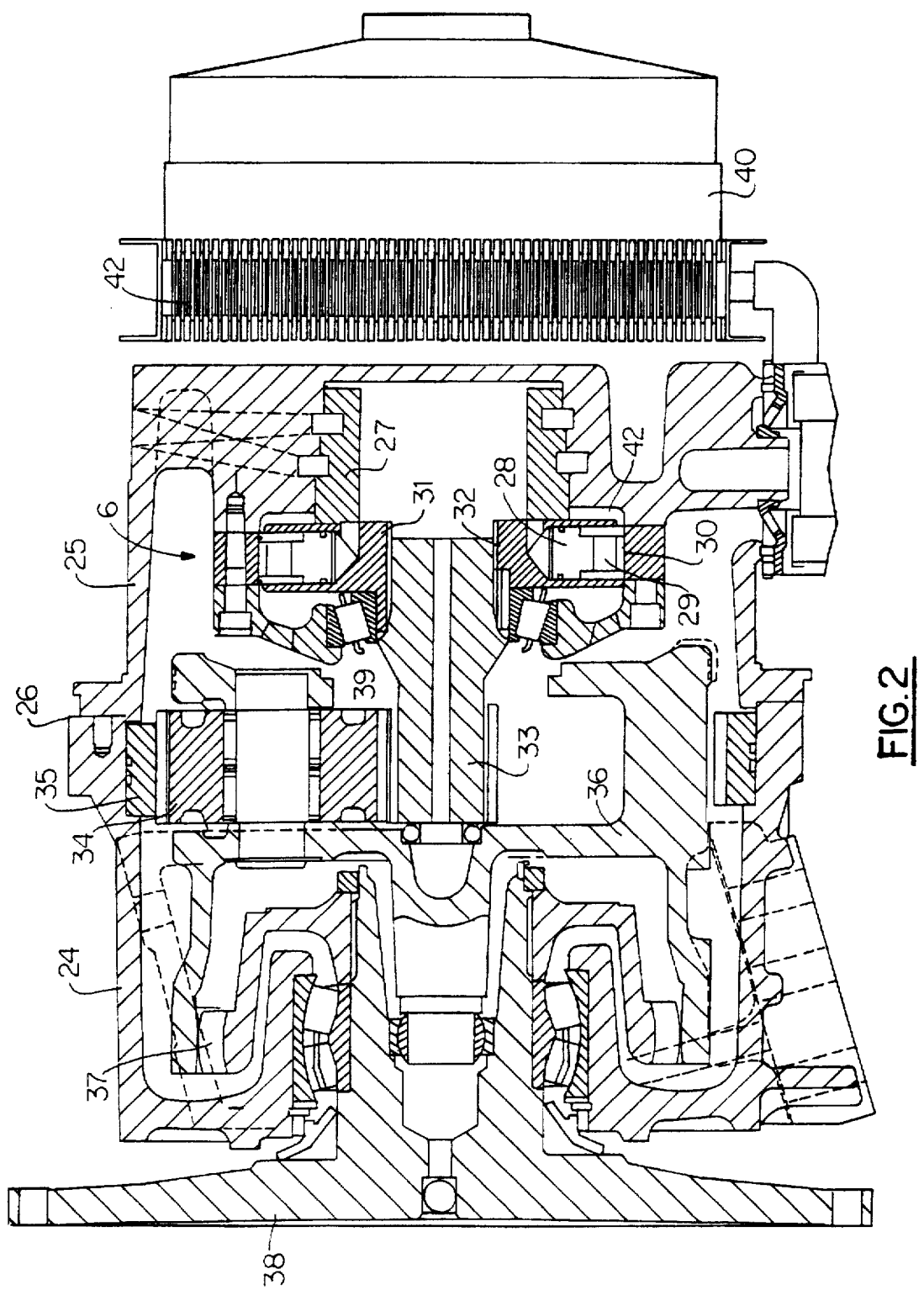
FIG. 2 is a practically designed mixing gear in longitudinal section.

A possible structural development of the hydrostatic-mechanical gear for driving a mixer drum is to be understood from FIG. 2.

The gear housing 9 is composed of two gear-housing halves 24 and 25. Therefore, only one sealing location 26 exists for the housing. The oil conveyed by the hydraulic pump 2 reaches the hydraulic motor 6 via a distributor 27. The oil presses against pistons 28 whereby a roller 29 moves along a cam 30. Hereby a cylinder block is set to rotate. Via a spline 32 the hydraulic motor 6 drives an inner central wheel 33 (sun) of the one-step planetary gear 7. Several planetary wheels 34 are in meshing driving connection with the inner central wheel 33 and an outer central wheel 35 fixed to the housing. A web 36 of the planetary gear 7 is hereby driven at a slow ratio. An input flange 38 of the concrete mixer drum (not shown in detail) is driven by a spiral gear 37.

The spline 32 exclusively transmits one torque. The inner central wheel 33 of the planetary gear 7 abuts against a collar 39 only in an axial direction on the cylinder block 31. A mounting in a radial direction is not provided. Therefore, the inner central wheel 33 of the planetary gear 7 can center itself. Thus, no tipping forces can act upon the hydraulic motor 6. In the embodiment of FIG. 2, the oil cooler 12 is flanged directly on the half 25 of the gear housing. A ventilator 40 is attached to the oil cooler 12. The drawing also makes it clear that the hydrostatic-mechanical gear, for driving a concrete mixer drum, particularly stands out by a compact construction. Within the gear housing 9 are housed the hydraulic motor 6, the one-step planetary gear 7, the same as the support and the drag connection of the input flange 38. The oil cooler 12 is either integrated in the gear housing 9 or directly screwed thereon. The filter 14 likewise is directly fastened to the gear housing 9.

Figure 3:
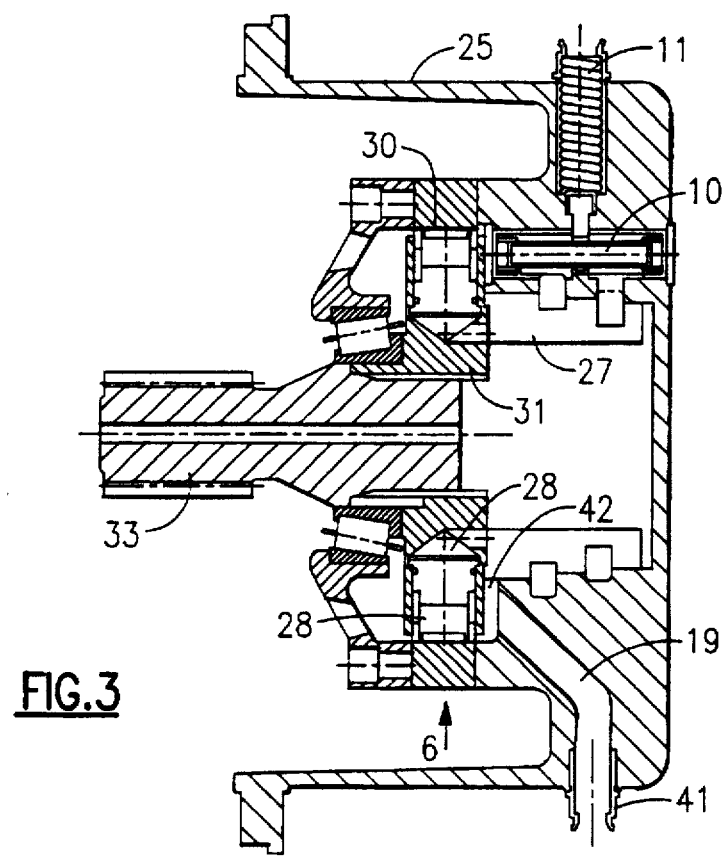
FIG. 3 is a housing half of the mixing gear showing details for the guidance of oil and FIG. 4 is a very simplified segment of a slow-speed radial piston hydraulic motor.

Features already mentioned with the explanation of the hydraulic diagram of FIG. 1 can be made still clearer with reference to FIG. 3. A connecting armature 41 serves to connect the pipe 19 which, for its part, branches off in turn from the oil cooler 12. The pipe 19 extends into the interior of the half 25 of the gear housing and discharges, as can be seen from the drawing, directly in an annular space 42 of the radial piston motor (hydraulic motor 6). As already mentioned, cooled oil flows from the pipe 19. Said oil flows through the hydraulic motor 6 and thus cools the essential structural elements of the hydraulic motor: pistons 28, rollers 29, cam 30 and cylinder block 31. The leakage oil exiting from the hydraulic motor 6, at an elevated temperature, mixes with the cool oil flowing in and is removed from the interior of the gear housing 9.

In the upper area of the gear-housing half 25 are the flushing slide valve 15 and the flushing valve 11.

Figure 4:
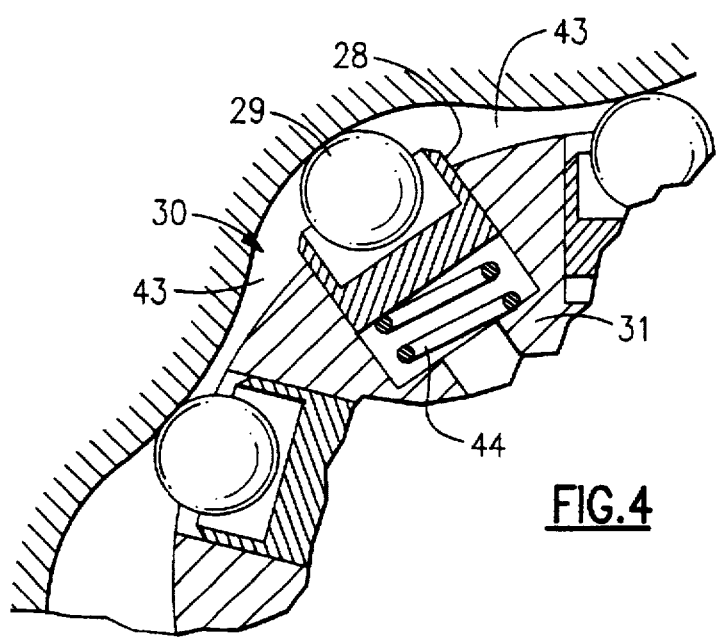

In FIG. 4, parts of the hydraulic motor 6 designed as a radial piston motor are reproduced in a very simplified manner. The pistons 28 are slidingly passed into the cylinder block 31. The pistons 28 abut over the rollers 29 on the cam 30 which has a substantially sinuous course. The cooled oil fed via the pipe 19 flows from the annular space 41 into interstices 43 so that oil flows in an axial direction through the radial piston motor.

From the drawing, it is to be understood that each piston 28 of the radial piston motor is passed into the cylinder block 31 under the action of a spring element 44. The spring elements 44 can be formed, for instance, from spiral compression springs. The spring elements 44 produce a constant force-locking connection between the rollers 29 of the pistons 28 and the cam 30. Hereby can be obtained the following essential advantage or can be solved the following problem: After the internal combustion engine (Diesel engine) is shut off, the concrete mixer drum tends to continue rotating. This occurs because the concrete masses that have been laterally guided to a high level on the inner wall of the drum descend by the action of gravity. This practically corresponds to a reversal in direction of rotation so that the hydraulic motor 6 becomes a pump. Said rotation is prevented by spring elements 43, since an interruption of the power flow from the concrete mixer drum to the hydrostatic part of the motor is prevented at least to an extent to make it negligible in practice.

| Reference numerals |
| --- |
| 1 shaft |
| 2 hydraulic pump |
| 3 supply pump |
| 4 pipe |
| 5 pipe |
| 6 hydraulic motor |
| 7 planetary gear |
| 8 pump housing |
| 9 gear housing |
| 10 flushing slide valve |
| 11 flushing valve |
| 12 oil cooler |
| 13 pipe |
| 14 filter |
| 15 pipe |
| 16 pipe |
| 17 pressure-limiting valve |
| 18 adjusting unit |
| 19 pipe |
| 20 connecting pipe |
| 21 connecting pipe |
| 22 connecting pipe |
| 23 pipe |
| 24 gear-housing half |
| 25 gear-housing half |
| 26 housing sealing place |
| 27 distributor |
| 28 piston |
| 29 roller |
| 30 cam |
| 31 cylinder block |
| 32 spline |
| 33 inner central wheel |
| 34 planetary wheel |
| 35 outer central wheel |
| 36 web |
| 37 spiral gearing |
| 38 input flange |
| 39 collar |
| 40 ventilator |
| 41 connecting armature |
| 42 annular space |
| 43 interstice |
| 44 spring element |

We claim:

1. A hydrostatic-mechanical gear, for driving a mixing drum of a concrete mixer vehicle, comprising:

a hydraulic pump (2) being connected via supply and return pipes (4, 5) with a hydraulic motor (6) and forming therewith a high pressure circuit, and said hydraulic motor (6) driving said mixing drum via a planetary gear set (7);

a pump housing (8) accommodating said hydraulic pump (2);

a gear housing (9), having an interior, accommodating both said hydraulic motor (6) and said planetary gear set (7);

a flushing slide valve (10) being attached to said supply and return pipes (4, 5) by connecting pipes (20, 21) so that, during operation of said hydrostatic-mechanical gear, heated oil is constantly removed from said high pressure circuit, via a flushing valve (11) and is replaced with cooled oil, and said flushing valve (11) being operatively connected with said flushing slide valve (10);

wherein said heated oil passes through an oil cooler (12) and is continuously deposited, during operation of said hydrostatic-mechanical gear, within the interior of said gear housing (9) via a deposit pipe (19).

2. A hydrostatic-mechanical gear according to claim 1, wherein both said flushing slide valve (10) and said flushing valve (11) are located within said gear housing (9).

3. A hydrostatic-mechanical gear according to claim 1, wherein a supply pump (3) pumps oil, via a further supply pipe (13) and a filter (14), from the interior of said gear housing (9).

4. A hydrostatic-mechanical gear according to claim 3, wherein said flushing slide valve (10) is a 3/3- directional valve and said flushing valve (11) is a pressure-limiting valve.

5. A hydrostatic-mechanical gear according to claim 1, wherein an outlet of said deposit pipe (19) is located in immediate proximity of said hydraulic motor (6).

6. A hydrostatic-mechanical gear according to claim 1, wherein said hydraulic motor (6) is a radial piston motor which comprises a cylinder block (31) and a cam (30), a plurality of rollers (29), and a plurality of pistons (28) with each piston (28) supporting a roller (29) which rolls on said cam during rotation of said hydraulic motor (6), and, during use, oil flows out of said deposit pipe (19) through said cam, said rollers, said pistons and said cylinder block thereby lubricating and cooling said cam, said rollers, said pistons, and said cylinder block.

7. A hydrostatic-mechanical gear according to claim 6, wherein a mixture is formed from oil flowing out of said deposit pipe (19) and leakage oil from said hydraulic motor (6).

8. A hydrostatic-mechanical gear according to claim 6, wherein each piston (28), supported in said cylinder block (31) of said hydraulic motor (6), is biased by spring elements (44) toward said cam (30) so that a constant contact between said rollers (29), said pistons (28) and said cam (30) always exists.

9. A hydrostatic-mechanical gear according to claim 1, wherein a drag connection between said hydraulic motor (6) and an inner central wheel (33) of said planetary gear set (7) is formed from a spline (32) which transmits torque exclusively in one direction.

10. A hydrostatic-mechanical gear according to claim 9, wherein said hydraulic motor includes a cylinder block which has a collar (39) and said inner central wheel (33) of said planetary gear set (7) abuts against said collar (39) of said cylinder block.

11. A hydrostatic-mechanical gear according to claim 9, wherein said spline (32) extends spherically in a longitudinal direction of said inner central wheel (33).

12. A hydrostatic-mechanical gear according to claim 1, wherein said gear housing (9) comprises two separate housing halves (24, 25) which are connectable with one another with a seal located therebetween.

13. A hydrostatic-mechanical gear according to claim 1, wherein said gear housing is a unitary system which comprises a filter (14), a tank (9), said oil cooler and said hydraulic motor (6), said gear housing defines said tank (9) and accommodates both said hydraulic motor (6) and said oil cooler (12), a cooled oil supply pipe (13) interconnects said tank (9) with a supply pump (3), connected to at least said high pressure circuit, to convey cooled oil to said high pressure circuit, and said filter is located in said cooled oil supply pipe (13).

14. A hydrostatic-mechanical gear according to claim 1, wherein said hydraulic motor (6) is a radial piston motor which operates at a relatively slow speed.

* * * * *